United States Patent
Mayer et al.

[19]

[11] Patent Number: 6,070,675
[45] Date of Patent: Jun. 6, 2000

[54] GEAR SHIFTABLE PLANETARY TRANSMISSION

[75] Inventors: Thomas Mayer, Biberist; Olivier Zeiter, Agarn; Stephan Keller, Solothurn, all of Switzerland

[73] Assignee: Scintilla AG, Solothrun, Switzerland

[21] Appl. No.: 09/256,989

[22] Filed: Feb. 24, 1999

[30] Foreign Application Priority Data

Mar. 4, 1998 [DE] Germany .......................... 198 09 134

[51] Int. Cl.[7] ................................................. B25D 11/04
[52] U.S. Cl. ............................................. 173/48; 173/216
[58] Field of Search ............................. 173/48, 176, 178, 173/216, 104, 109

[56] References Cited

U.S. PATENT DOCUMENTS

| | | | |
|---|---|---|---|
| 4,274,304 | 6/1981 | Curtiss | 173/48 |
| 4,585,077 | 4/1986 | Bergler | 173/48 |
| 5,159,986 | 11/1992 | Hoser | 173/48 |
| 5,282,510 | 2/1994 | Pacher | 173/48 |
| 5,704,433 | 1/1998 | Bourner et al. | 173/48 |
| 5,842,527 | 12/1998 | Arakawa et al. | 173/104 |

FOREIGN PATENT DOCUMENTS 42 13 291 C2  12/1997  Germany .

*Primary Examiner*—Scott A. Smith
*Attorney, Agent, or Firm*—MIchael J. Striker

[57] ABSTRACT

A gear switchable planetary transmission for an electric hand power tool has a transmission housing, a hollow gear which is axially displaceable for a gear shifting and provided with a peripheral groove, a gear shifting member for an axial displacement of the hollow gear and provided with radial fingers engaging in the peripheral groove of the hollow gear, the gear shifting member having a shifting sleeve sliding on the gear transmission and at least one finger which is formed as a loop in at least one wire bracket, so that the at least one wire bracket is axially non displaceably inserted in the shifting sleeve and with its at least one loop engages through radial passages which are arranged over a periphery of the switching sleeve with offset in the transmission housing.

7 Claims, 2 Drawing Sheets

GEAR SHIFTABLE PLANETARY TRANSMISSION

BACKGROUND OF THE INVENTION

The present invention relates generally to gear shiftable planetary transmissions, which can be used in particular for an electric hand power tools, for example accu-screwdrivers.

A known planetary transmission of this type is disclosed for example in the German Patent Document DE 42 13 291 A1. It has a gear shifting member which is provided with a gear shifting slider engageable with two pin-shaped fingers in a groove of a hollow gear. It also has a turnable gear shifting handle with a radially oriented rotary axis which, for the axial displacement of the gear shifting slider, engages with one pin in a coulisse guide of the gear shifting slider. The above described gear shiftable planetary transmission can be further improved.

SUMMARY OF THE INVENTION

Accordingly, it is an object of present invention to provide a gear shiftable transmission of the above mentioned general type which avoids the disadvantages of the prior art.

In keeping with these objects and with others which will become apparent hereinafter, one feature of the present invention resides, briefly stated in a gear shiftable planetary transmission in which the gear shifting member has a shifting sleeve which slides on the transmission housing and at least one finger which is formed in at least one wire bracket as a loop, at least one wire bracket is inserted axially non-displaceably in the switching sleeve and with its at least one loop extends in a radial passage which is arranged offset in the transmission housing, over the periphery of the switching sleeve.

When the gear switchable planetary transmission is designed in accordance with the present invention, it has the advantage of an extremely secure operation of the gear switching member which is mountable completely automatically.

For this purpose the switching sleeve is simply straddled over the transmission housing and at least one wire bracket which is formed correspondingly for the fully automatic mounting is pressed into the opening in the switching sleeve so that it is fixed axially non displaceably. With a simple mounting step it is guaranteed that the loop of the wire bracket engages in the groove of the hollow gear. The switching sleeve is guided on the transmission housing easily accessible and reliable. The at least three loops of the wire bracket engaging in the groove of the hollow gear prevent a tilting or edging of the hollow gear during a displacing process and a wobbling of the hollow gear in the event of high rotary speeds. The switching sleeve overlaps the passage in the transmission housing so that only a little grease can exit the planetary transmission. The small grease quantity which exits nevertheless serves for lubrication of the switching sleeve.

In accordance with a preferable embodiment of the present invention, the wire bracket is composed of spring steel. Thereby in the transmission a spring element is also integrated, which during the colliding between two teeth of the hollow gear and the transmission housing or the hollow gear and the planetary carrier during the switching process, can deviate, Thereby a switching in an immovable condition is possible.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENT

Figure 1:
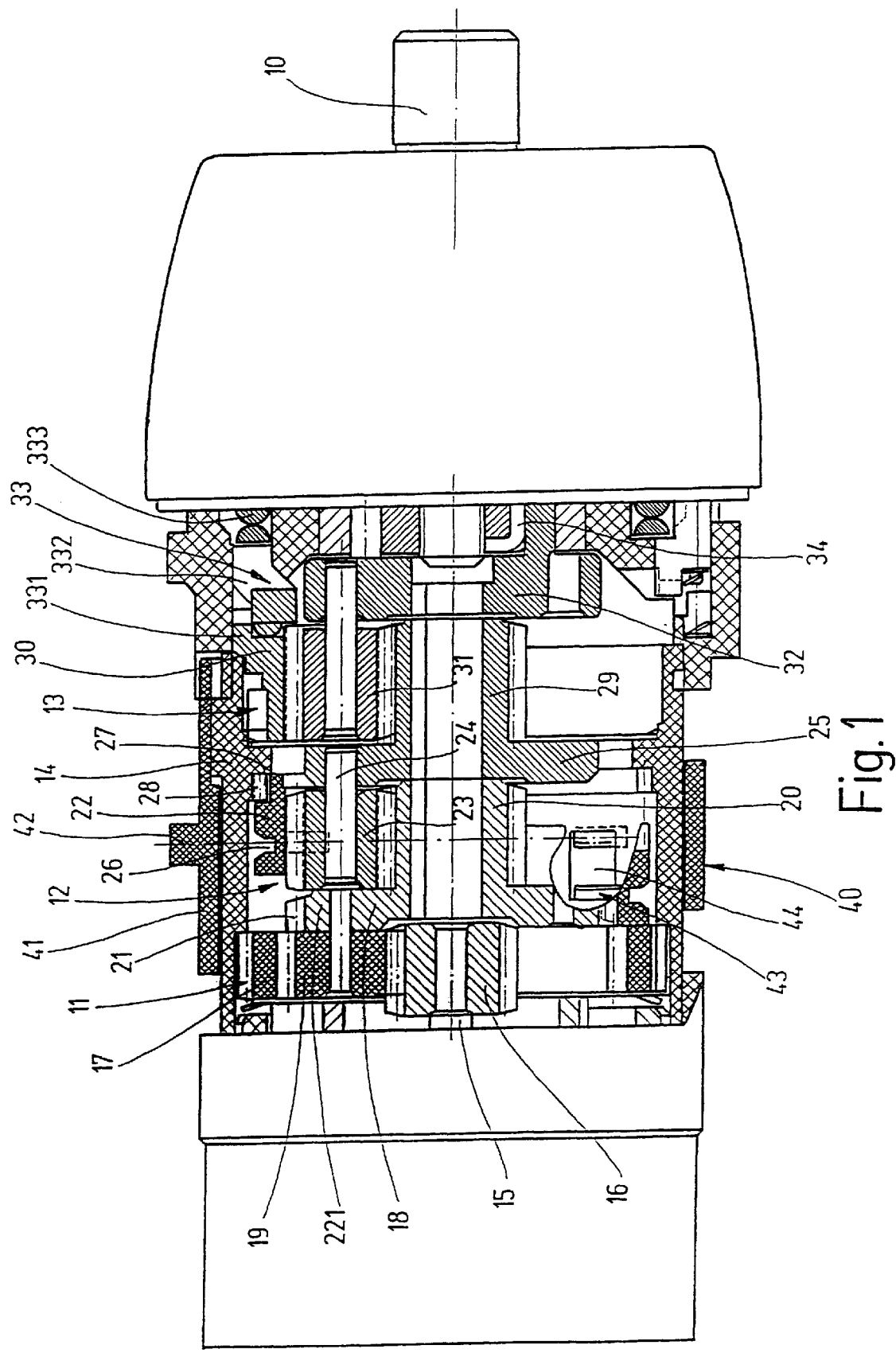
FIG. 1 is a side view of an accu-screwdriver, partially sectioned in accordance with the present invention.

A hand-guided accu-screwdriver is shown in FIG. 1 on a side view and partially in section as an example of an electrical hand held power tool. It has a rotatably supported tool spindle 10 which is received in a not shown rotary bearing. The tool spindle 10 is driven from a not shown electric motor through a gear shiftable planetary transmission. The planetary transmission shown in section in FIG. 1 has three floatingly supported planetary stages 11, 12 and 13. They are integrated in a transmission housing 14. The first planetary stage 11 has a sun gear 16 which is arranged non rotatably on a driven shaft 15 of the electric motor, a hollow gear 17 which is non rotatably fixed on the transmission housing 14, and three planetary gears 19 which are rotatably supported on a planetary gear carrier 18 and engage with the sun gear 16 and the inner teeth of the hollow gear 17. The planetary gear carrier 18 is formed of one piece with the sun gear 20 of the second planetary stage 12 and additionally is provided with outer teeth 21 on its outer periphery.

The second planetary stage 12 further has an axially displaceable hollow gear 22 which engages through its inner teeth 221 with planetary gears 23. The planetary gears 23 in turn engage with the sun gear 20 and are rotatably arranged on the planetary gear axles 24 which are mounted in a planetary gear carrier 25. The hollow gear 22 is provided with the peripheral groove 26 and with outer teeth 27 arranged at an end side of the hollow gear 22 which faces away from the planetary gear carrier 18 of the first planetary stage 11. They correspond to the inner teeth 28 formed on the transmission housing 14. The third planetary stage 13 further has a sun gear 29 which is formed of one piece with the planetary gear carrier 25 of the second planetary stage 12, planetary gears 31 which engage with the planetary gear 29 and the inner teeth of a first hollow shaft 30, and a planetary gear carrier 32 on which the rotary axles of the planetary gears 31 are mounted. A coupling part 331 of a torque coupling 33 is formed in the hollow gear 30. It engages with an immovable coupling part 332 under a tensioning force of a coupling spring 333. The planetary gear carrier 32 of the third planetary stage 13 is non rotatably connected with the tool spindle 10 through a connecting member 34 which is partially shown in FIG. 1.

The axially displaceable hollow gear 22 of the second planetary stage 12 serves for gear shifting of the planetary transmission which is designed here as a two-gear transmission. When the hollow gear 22 engages with the inner teeth 28 of the transmission housing 14, it is held non rotatably and the planetary gears 23 which are driven from the sun gear 20 are rotated in the inner teeth 221 of the hollow gear 22 and rotate the planetary gear carrier 25 and thereby the sun gear 29 of the third planetary stage 13. Since the hollow gear of the third planetary stage 13 is held non rotatably by the torque coupling 33 until reaching an adjusted rotary torque, the planetary carrier 31 of the third planetary stage 13 is also rotated in the inner teeth 221 of the hollow gear 30 and rotates the tool spindle 10 through the planetary gear carrier 32. Therefore the first gear of the planetary transmission is activated.

When the hollow gear 22 is displaced to the left in FIG. 1, the first the outer teeth 27 on the hollow gear 22 and the inner teeth 28 on the transmission housing 14 disengage from one another. During a further displacement of the hollow gear 22, the inner teeth of the hollow gear 22 engaging with the planetary carrier 23 are displaced into the outer teeth 21 on the planetary gear carrier 18 of the first planetary stage 11. Thereby the planetary gears 23 are blocked, and the second planetary stage is inactivated. Therefore a rotation of a planetary gear carrier 18 of the first planetary stage 11 is transmitted 1:1 to the sun gear 29 of the third planetary stage 13 which is one piece with the planetary gear carrier 25 of the second planetary stage 12. Thereby the second gear of the planetary transmission is activated.

Figure 2:
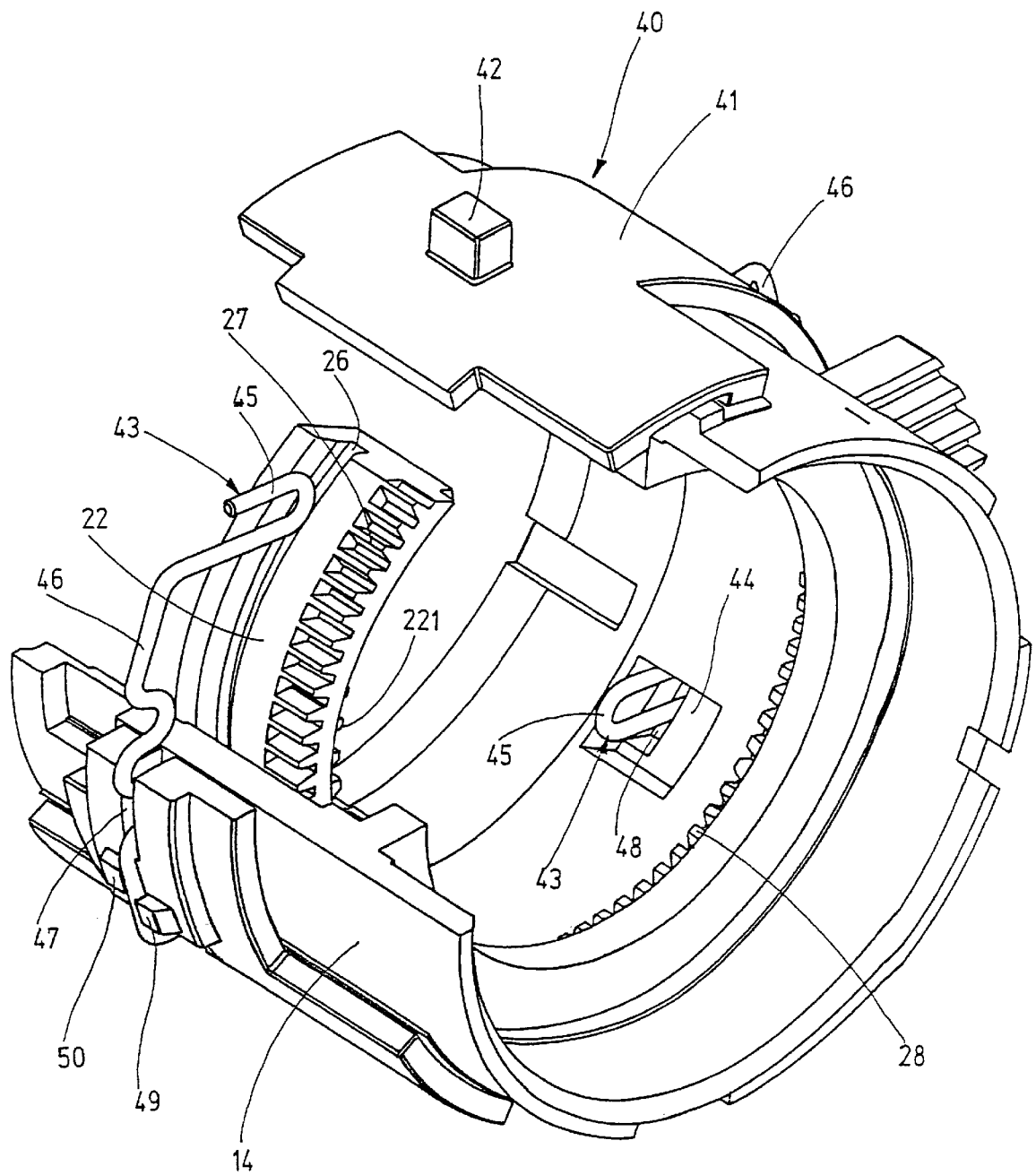
FIG. 2 is a perspective view of a gear switching member of the accu-screwdriver of FIG. 1.

A gear shifting member 40 is provided for the axial displacement of the hollow gear 22 and is operated manually. The gear shifting member 40 has a shifting sleeve 41 which is slidingly seated on a transmission housing 14, on which a gripping pin 42 radially projects for a manual actuation. The shifting sleeve 41 in the shown example has four fingers 43 which are preferably uniformly distributed over the periphery of the switching sleeve 41 and engage through radial passages 44 in the transmission housing 14 in the peripheral groove 26 in the hollow gear 22. FIG. 2 shows a perspective view of the gear shifting member 40, and for visibility it is partially sectioned.

The fingers 43 of the switching sleeve 41 are formed by loops 45 which together form three wire brackets 46. The loops produced by U-shaped bending of the wire ends of the wire bracket 46 are composed of spring steel. The wire brackets 46 are shaped so as to provide a fully automatic mounting of the gear shifting member 40. The both wire brackets 46 are axially not displaceably fixed on the shifting sleeve 41 with an offset relative to one another by a same peripheral angle. For this purpose they are inserted in recesses 47 on the periphery of the shifting sleeve 41.

The loops 45 of the wire brackets 46 extend through the slots 48 in the shifting sleeve 41, which are formed in the shifting sleeve 41 in the region of the passages 44 for the transmission housing 14. In addition, several claw pairs are arranged on the periphery of the shifting sleeve 41. They are formed each of two axially oppositely located claws 49 and 50. The claws are arranged so that in a peripheral direction they coincide with the recesses 47 for receiving of the wire brackets 46, and a wire bracket portion of the wire bracket 46 is clamped correspondingly between them.

During the fully automatic mounting of the gear shifting member 40, the shifting sleeve 41 is straddled over the transmission housing 14 of the finally mounted planetary transmission, and the springy wire brackets 46 are inserted in the recesses 47 so that the loops 45 pass through the radial slots 48 in the switching sleeve 41. The wire bracket 46 is snapped between the claws 49 and 50. During pressing of the wire bracket 46 it is necessary to take into consideration that on the one hand the rotary position of the shifting sleeve 41 relative to the transmission housing 14 is such that the radial slots 48 are located in the shifting sleeve 41 coradially with the passages 44 in the transmission housing 14, and on the other hand the axial displacing position of the shifting sleeve 41 is adjusted so that the loops 45 of the wire bracket 46 which extend through the slots 48 and the passages 44 engage in the peripheral groove 26 in the hollow gear 22 as shown in FIG. 2.

When the shifting sleeve 41 is displaced by the gripping pin 42 axially on the transmission housing 14, then four loops 45 of the both wire brackets 46 which engage in the peripheral groove 26 in the hollow gear 22 drive the hollow gear 22, so that it is reciprocatingly movable without tilting between its two end positions and can be fixed with its inner teeth 221 on the planetary carrier 18 and with its outer teeth 27 on the planetary housing 14. When a tooth does not meet a gap, but instead a tooth meets a tooth, then due to the springy properties of the wire bracket 44, the loops 45 somewhat deviate, so that by the increased spring force the hollow gear 22 is insignificantly turned, and thereby shifting is possible in the inmovable position of the planetary transmission.

It will be understood that each of the elements described above, or two or more together, may also find a useful application in other types of constructions differing from the types described above.

While the invention has been illustrated and described as embodied in gear shift planetary transmission, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A gear switchable planetary transmission for an electric hand power tool, comprising a transmission housing; a hollow gear which is axially displaceable for a gear shifting and provided with a peripheral groove; a gear shifting member for an axial displacement of said hollow gear and provided with radial fingers engaging in said peripheral groove of said hollow gear, said gear shifting member having a shifting sleeve sliding on said gear transmission and at least one finger which is formed as a loop in at least one wire bracket, so that said at least one wire bracket is axially non displaceably inserted in said shifting sleeve and with its at least one loop engages through radial passages which are arranged over a periphery of said switching sleeve with offset in said transmission housing.

2. A gear switchable planetary transmission as defined in claim 1, wherein said switching sleeve has recesses provided in an outer periphery of said switching sleeve, at least one of said wire brackets being inserted in said recesses.

3. A gear switchable planetary transmission as defined in claim 2, wherein said switching sleeve has radial slots, said loops extending through said radial slots of said switching sleeve.

4. A gear switchable planetary transmission as defined in claim 1, wherein said switching sleeve is provided on an outer periphery with claws which are located opposite to one another in an axial direction, so that at least one wire bracket is clamped between said claws.

5. A gear switchable planetary transmission as defined in claim 1, wherein said at least one wire bracket is composed of spring steel.

6. A gear switchable planetary transmission as defined in claim 1, wherein two said wire brackets are arranged on said switching sleeve offset relative to one another by a same peripheral angle and each provided with two said loops.

7. A gear switchable planetary transmission as defined in claim 6, wherein each of said loops is U-shaped on one end of said wire bracket.

* * * * *